Nov. 5, 1968 C. F. PHILLIPS, JR 3,409,830
SYSTEM FOR DETERMINING LOWEST VOLTAGE IN A PLURALITY OF CHANNELS
Filed July 8, 1964 2 Sheets-Sheet 1

INVENTOR.
CALVERT F. PHILLIPS Jr.
BY
ATTORNEYS

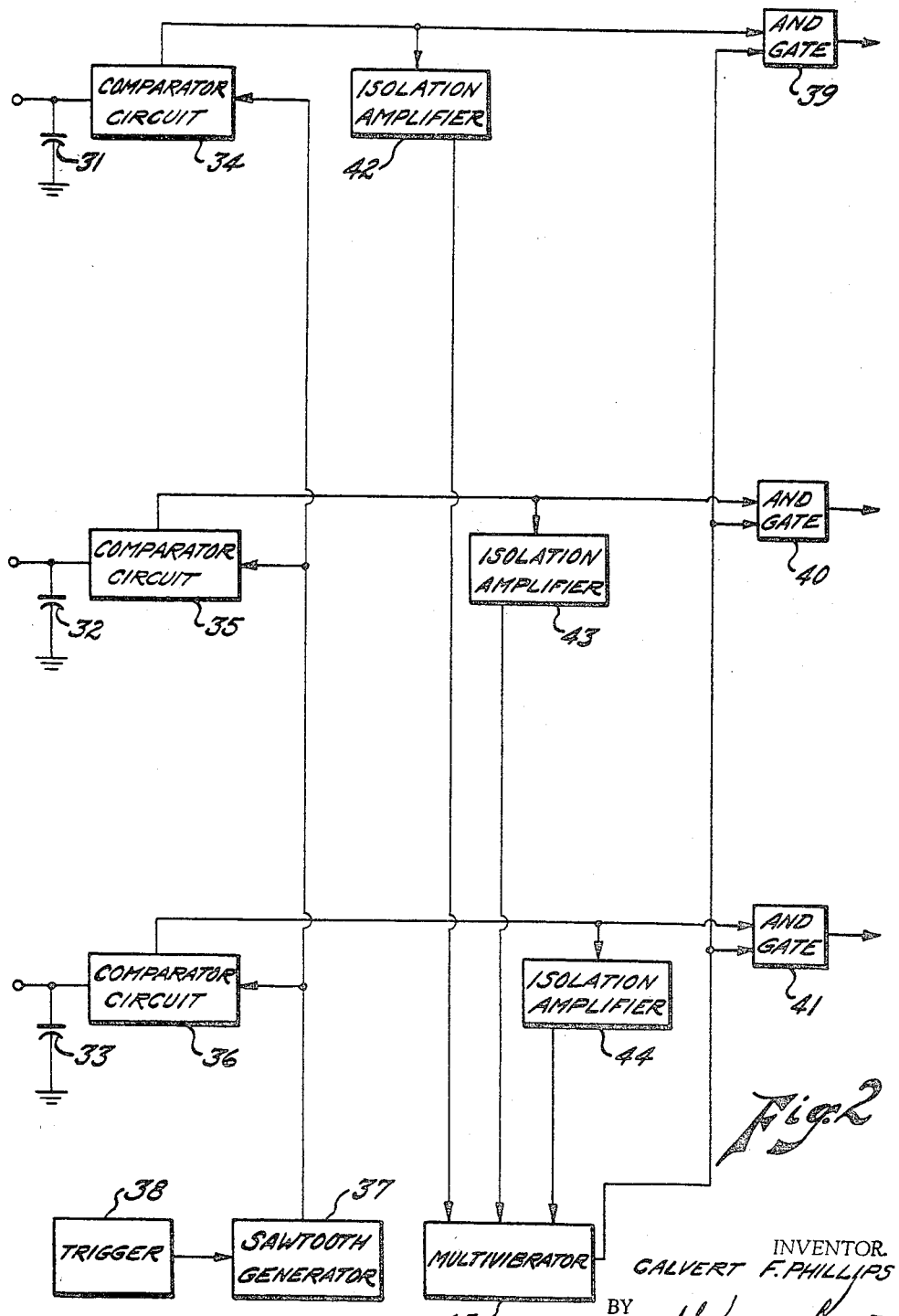

United States Patent Office 3,409,830
Patented Nov. 5, 1968

3,409,830
SYSTEM FOR DETERMINING LOWEST VOLTAGE
IN A PLURALITY OF CHANNELS
Calvert F. Phillips, Jr., Annapolis, Md., assignor, by mesne
assignments, to the United States of America as represented by the Secretary of the Air Force
Filed July 8, 1964, Ser. No. 381,274
4 Claims. (Cl. 324—103)

ABSTRACT OF THE DISCLOSURE

The minimum voltage of a plurality of voltages in a plurality of channels is determined by comparing each of the voltages simultaneously with an increasing ramp voltage. Coincidence of one of the voltages, the minimum voltage, operates a switch, which can be operated only once, to gate the channel carrying the voltage having coincidence with the ramp voltage.

This invention relates to a system for comparing the voltage levels in a number of channels and, more particularly, to a system for identifying the channel having the lowest voltage.

In a radar system where there are a number of channels, each having an integrating capacitor charged to a voltage during a radar interpulse period by an external source, each capacitor can have a different voltage at the end of the charging period. Circuitry may be needed to determine the channel having the lowest voltage on the charged capacitor which may then be identified by an output pulse. This output pulse would represent only the identification of the channel having the lowest voltage and there would be no requirement for indicating the actual amplitude of the voltage.

It is an object of this invention to provide a system of comparing the voltage levels in a number of channels.

Another object is to provide a system for identifying the channel having the lowest voltage in a number of channels.

Figure 1A:
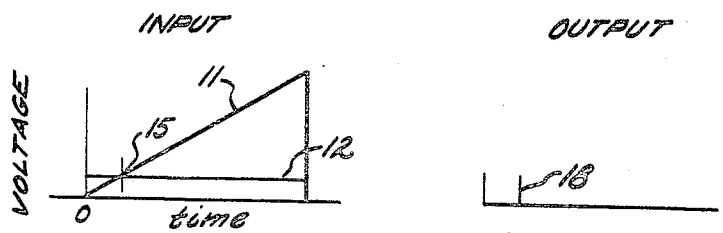
Figure 1B:
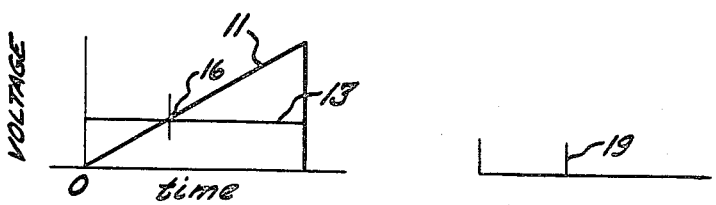
Figure 1C:
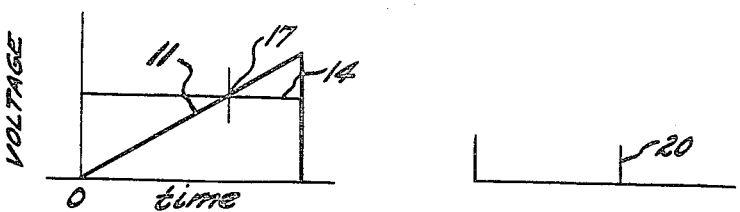

Other objects and features of this invention will become more apparent by reference to the following description when taken in conjunction with the accompanying drawings in which:

FIG. 1a, FIG. 1b, and FIG. 1c show in diagrammatic form, the basic principle for converting voltage levels into time relationships; and FIG. 2 is a block diagram showing an embodiment of this invention.

The voltage from each of aforesaid charged capacitors is mixed with a sawtooth voltage waveform or any increasing voltage such that when the amplitude of this voltage just equals the amplitude of the charged voltage, a pulse is generated. Circuitry appropriate for this use would be a typical balanced circuit employing two tubes with a common cathode resistor. The sawtooth voltage is applied to the grid of one tube while the capacitor voltage is applied to the grid of the other tube. A variable bias is also applied to the grid of the tube to which the capacitor voltage is applied in order to compensate for differences in the capacity of the capacitors. After the increasing voltage waveform has been applied, a clamping waveform is applied to discharge the storage or integrating capacitor.

FIG. 1a, FIG. 1b, and FIG. 1c show how various values of constant or DC voltage can be converted to equivalent values of time. Sawtooth waveform 11 is compared with DC voltage values 12, 13, and 14. Voltage 12 will equal sawtooth voltage 11 at point 15 and an output pulse will be indicated at time 18. At a later time, the greater voltage 13 will equal sawtooth voltage 11 at point 1b and an output pulse will be indicated at time 19. At a still later time, the still greater voltage 14 will equal sawtooth voltage 11 and an output pulse will be indicated at time 20.

Referring to FIG. 2, capacitors 31, 32, and 33 are tested to determine the one having the lowest voltage. The voltages on capacitors 31, 32, and 33 are compared in comparator circuits 34, 35, and 36, respectively, with the output of sawtooth generator 37 which is activated by trigger 38. When the voltage of capacitors 31, 32, and 33 equal the output of sawtooth generator 37, output pulses are generated by comparator circuits 34, 35, and 36. The output pulses are fed to AND gates 39, 40, and 41, respectively. The output pulses are also fed to bistable multivibrator 45 after being isolated from comparator circuits 34, 35, and 36 by isolation amplifiers 42, 43, and 44, respectively. The output of multivibrator 45 is fed into each AND gate 39, 40, and 41. The capacitor having the lowest voltage causes the comparator circuit associated therewith to produce the first output pulse which is thereupon fed into the associated AND gate. This output pulse is also fed to multivibraor 45 which produces an output that is fed to AND gates 39, 40, and 41. An output pulse is produced at the AND gate, associated with the capacitor having the lowest voltage, because of the coincidence of the input pulses. This identifies the capacitor having the lowest voltage. There are no outputs at the other AND gates because bistable multivibrator 45 is not in the proper state to produce an output that would coincide in time with output from the other comparator circuits.

What I claim is:

1. An apparatus for determining the channel having the lowest voltage in a plurality of channels comprising: means for generating an increasing voltage; a plurality of comparator circuits each of which is connected to one each of the plurality of channels and to the generating means, the comparator circuits producing a pulse when the output of the respective channels just equals the output of the generating means; a bistable multivibrator connected to each of the outputs of the plurality of comparator circuits; a plurality of AND gates each of which is connected to one each of the outputs of the plurality of comparator circuits, and to the output of the bistable multivibrator, the AND gates producing a pulse upon the coincidence of outputs from the bistable multivibrator and the respective comparator circuits, thereby indicating the channel having the lowest voltage.

2. An apparatus for determining the channel haveing the lowest voltge in a plurality of channels comprising: a sawtooth genertaor voltage; a plurality of comparator circuits each of which is connected to one each of the plurality of channels and to the sawtooth generator, the comparator circuits producing a pulse when the output of the respective channels just equals the output of the sawtooth generator; a bistable multivibrator connected to each of the outputs of the plurality of comparator circuits; a plurality of AND gates each of which is connected to one each of the outputs of the plurality of comparator circuits and the output of the bistable multivibrator, the AND gates producing a pulse upon the coincidence of outputs from the bistable multivibrator and the respective comparator circuits, thereby indicating the channel having the lowest voltage.

3. An apparatus for determining the channel having the lowest voltage in a plurality of channels comprising: means for generating an increasing voltage; a plurality of comparator circuits each of which is connected to one each of the plurality of channels and to the generating means, the comparator circuits proucing a pulse when the output of the respective channels just equals the output of the generating means; a bistable multivibrator connected to each of the outputs of the plurality of comparator circuits; a plurality of isolation amplifiers interposed between the multivibrator and the respective comparator circuits; a plurality of AND gates each of which is connected to one each of the outputs of the plurality of comparator circuits and to the output of the bistable multivibrator, the AND gates producing a pulse upon the coincidence of outputs from the bistable multivibrator and the respective comparator circuits, thereby indicating the channel having the lowest voltage.

4. An apparatus for determining the channel having the lowest voltage in a plurality of channels comprising: a sawtooth generator for increasing voltage; a plurality of comparator circuits each of which is connected to one each of the plurality of channels and to the sawtooth generator, the comparator circuits producing a pulse when the output of the respective channels just equals the output of the sawtooth generator; a bistable multivibrator connected to each of the outputs of the plurality of comparator circuits; a plurality of isolation amplifiers interposed between the multivibrator and the respective comparator circuits; a plurality of AND gates each of which is connected to one each of the outputs of the plurality of comparator circuits and to the output of the bistable multivibrator, the AND gates producing a pluse upon the coincidence of outputs from the bistable multivibrator and the respective comparator circuits, thereby indicating the channel having the lowest voltage.

References Cited
UNITED STATES PATENTS

| | | | |
|---|---|---|---|
| 3,123,722 | 3/1964 | Ralphs | 328—147 X |
| 3,189,875 | 6/1965 | Hendrickson | 340—172 X |
| 3,267,375 | 8/1966 | Olsen | 324—103 |

OTHER REFERENCES

A. J. Stressman, Automatic Measurement of Voltage Tolerances, Feb., 1956 Electronics, vol. 29, No. 2, pp. 150–151.

RUDOLPH V. ROLINEC, *Primary Examiner.*

E. F. KARLSEN, *Assistant Examiner.*